US 11,362,553 B2

(12) United States Patent
Deng et al.

(10) Patent No.: US 11,362,553 B2
(45) Date of Patent: Jun. 14, 2022

(54) MOTOR ROTOR

(71) Applicant: FORD GLOBAL TECHNOLOGIES, LLC, Dearborn, MI (US)

(72) Inventors: Chuan Deng, Jiangsu (CN); Yigang Yuan, Jiangsu (CN); Guohua Du, Jiangsu (CN); Joy Gong, Jiangsu (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 261 days.

(21) Appl. No.: 16/739,500

(22) Filed: Jan. 10, 2020

(65) Prior Publication Data

US 2020/0235642 A1   Jul. 23, 2020

(30) Foreign Application Priority Data

Jan. 18, 2019   (CN) .......................... 201910047304.6

(51) Int. Cl.
*H02K 1/27* (2022.01)
*H02K 1/276* (2022.01)
*H02K 11/01* (2016.01)

(52) U.S. Cl.
CPC .......... *H02K 1/2766* (2013.01); *H02K 1/276* (2013.01); *H02K 11/012* (2020.08)

(58) Field of Classification Search
CPC ...... H02K 1/2706; H02K 1/27; H02K 1/2766; H02K 2213/03; H02K 1/28; H02K 21/16; H02K 1/276; H02K 1/2773; H02K 1/278; H02K 1/2781; H02K 1/2783; H02K 11/012; H02K 11/014; H02K 11/0141
See application file for complete search history.

(56) References Cited

U.S. PATENT DOCUMENTS 7,479,723 B2   1/2009   Dawsey et al.
8,508,092 B2   8/2013   Ankeney et al.
(Continued)

FOREIGN PATENT DOCUMENTS

DE   102017205858 A1   4/2018
WO   2011132250 A1   10/2011

OTHER PUBLICATIONS

Ugale, Rajaram Tukaram, et al. "Overview of research evolution in the field of line start permanent magnet synchronous motors," published by The Institution of Engineering and Technology Oct. 20, 2013, pp. 141-154.
(Continued)

*Primary Examiner* — Quyen P Leung
*Assistant Examiner* — Leda T Pham
(74) *Attorney, Agent, or Firm* — Brooks Kushman PC; David Kelley

(57) ABSTRACT

A motor rotor may include a body having axially extending first and second magnets embedded into the body, the first magnet and the second magnet being arranged at an angle and spaced apart by an axially extending magnetic shielding component. The first magnet includes a first surface away from a central axis of the rotor body and a second surface facing the central axis. The second magnet includes a third surface away from the central axis and a fourth surface facing the central axis, wherein the first surface and the third surface and extension surfaces thereof define a first area of the body part away from the central axis and a second area of the body part close to the central axis.

17 Claims, 8 Drawing Sheets

(56) References Cited

U.S. PATENT DOCUMENTS

| | | | |
|---|---|---|---|
| 9,369,012 B2* | 6/2016 | Hattori | H02K 1/27 |
| 9,806,570 B2 | 10/2017 | Hamanaka et al. | |
| 10,714,994 B2* | 7/2020 | Hosoda | H02K 21/16 |
| 2013/0026871 A1* | 1/2013 | Van Dam | H02K 1/2766 |
| | | | 310/156.08 |
| 2013/0026872 A1* | 1/2013 | Cirani | H02K 1/2766 |
| | | | 310/156.08 |
| 2015/0137632 A1* | 5/2015 | Takahashi | H02K 1/2766 |
| | | | 310/54 |
| 2016/0126814 A1* | 5/2016 | Hamanaka | H02K 15/03 |
| | | | 29/598 |
| 2017/0169945 A1 | 6/2017 | Lambourne et al. | |
| 2018/0191208 A1 | 7/2018 | Kubo et al. | |
| 2018/0287439 A1 | 10/2018 | Degner et al. | |

OTHER PUBLICATIONS

Yang, Hui et al., "Flux Adjustable Permanent Magnet Machines: A Technology Status Review" published by The Chinese Journal of Electrical Engineering in Dec. 2016 pp. 14-30.

European Examination Report dated May 28, 2020, for related European Appln. No. 20150874.4; 8 Pages.

* cited by examiner

MOTOR ROTOR

CROSS-REFERENCE TO RELATED APPLICATIONS

This application claims foreign priority benefits under 35 U.S.C. § 119(a)-(d) to CN Application 2019 100 473 04.6 filed Jan. 18, 2019, which is hereby incorporated by reference in its entirety.

TECHNICAL FIELD

The present application relates to a rotor and a manufacturing method.

BACKGROUND

Electric machines have wide application in vehicles and other fields and while often referred to as simply motors, may be operable as a motor and/or generator. Typically, the electric machine or motor includes a rotor in the center and a stator approximately in the shape of a cylinder. The rotor may have windings formed by winding wires. The design of the rotor, which may include windings on the surface or magnets embedded in the rotor, depends on the varieties of the motors. One design for a permanent magnet motor is to insert magnets into the rotor in a V shape when viewed from the end surface of the motor. One of the research focuses to improve motor performance is related to how to more efficiently use the flux generated by the magnets.

US20170169945 provides a motor with a first magnet and a second magnet embedded in a rotor. The first magnet and the second magnet are spaced apart by a gap. The gap or bridge area is prone to magnetic leakage. To reduce magnetic leakage, nonmagnetic materials are provided to fill the bridge area.

U.S. Pat. No. 8,508,092 provides a motor rotor, wherein a soft magnetic material 130 is formed around a spindle 110, sintered magnets 120 are embedded into material 130, and a roughly V-shaped bridge area between the magnets 120 and the ends of the V shape are filled with a nonmagnetic material. In addition, the motor rotor is formed and fixed by using a frame 300.

SUMMARY

According to one aspect of the present application, a motor rotor is provided. The motor rotor may comprise a rotor body part, a first magnet and a second magnet embedded into the body part and axially extended, the first magnet and the second magnet being arranged at an angle and spaced apart by a magnetic shielding component extended axially. The first magnet comprises a first surface away from a central axis of the rotor body part and a second surface facing the central axis; the second magnet comprises a third surface away from the central axis and a fourth surface facing the central axis, wherein the first surface and the third surface and extension surfaces thereof define a first area of the body part away from the central axis and a second area of the body part close to the central axis, wherein the magnetic shielding component is provided with a first contact surface located within the first area and a second contact surface located within the second area; the first contact surface faces the central axis and is in contact with the first area, and the second contact surface faces a periphery of the rotor body part and is in contact with the second area.

According to one embodiment of the present application, a material of the first magnetic shielding component is integrally formed of a nonmagnetic material.

According to another embodiment of the present application, the material of the first magnetic shielding component comprises stainless steel.

According to still another embodiment of the present application, in a cross section perpendicular to the central axis, the first magnet and the second magnet are generally arranged in a V shape; the magnetic shielding component may comprise a base, a head connected with the base and located in the first area, and a tail connected with the base and located in the second area. The head of the magnetic shielding component comprises a first contact surface, and the tail comprises a second contact surface. A first side of the base of the magnetic shielding component is adjacent to the first magnet, and a second side of the base is adjacent to the second magnet.

According to still another embodiment of the present application, a width of the head of the magnetic shielding component is greater than a width of the base; a width of the tail is greater than the width of the base; and a direction of the width is basically perpendicular to a radial direction of the rotor; and when the rotor is subjected to a centrifugal force during rotation, the first contact surface of the head is in contact with the first area to provide a reaction force opposite to counteract the centrifugal force, so that the head of the magnetic shielding component remains in contact with the first area; and the second area is in contact with the second contact surface of the tail to provide a reaction force to counteract the centrifugal force, so that the tail of the magnetic shielding component remains in contact with the second area.

According to still another embodiment of the present application, the magnetic shielding component is in mirror symmetry relative to a radial line.

According to still another embodiment of the present application, a width of the tail of the magnetic shielding component is greater than the width of the head, wherein the width of the tail is roughly one to two times the width of the head.

According to another embodiment of the present application, a point at the tail of the magnetic shielding component closest to the central axis does not extend beyond an intersection point of an extension surface of the second surface of the first magnet and the fourth surface of the second magnet.

According to still another embodiment of the present application, the magnetic shielding component further comprises a pair of wings radially located between the head and the tail, and the pair of wings comprising a first side and a second side respectively in contact with the first magnet and the second magnet.

According to still another embodiment of the present application, in the cross section perpendicular to the central axis, the first magnet is provided with a length extending along the first surface and a width perpendicular to the length; the second magnet is provided with a length extending along the second surface and a width perpendicular to the length; the pair of wings are provided with a length and a width perpendicular to the length; and the width of each wing is smaller than the width of the first magnet and smaller than the width of the second magnet.

According to still another embodiment of the present application, the rotor further comprises a third magnet and a fourth magnet. The third magnet and the fourth magnet generally form a V shape and are farther away from the central axis than the first magnet and the second magnet in the radial direction, such that the first magnet, the second magnet, the third magnet, and the fourth magnet form a double V-shaped magnet structure. The magnetic shielding component comprises the base, the head connected with the base and located in the first area and the tail connected with the base and located in the second area; the base is provided with a first pair of wings extending from two sides thereof and are respectively adjacent to the first magnet and the second magnet and a second pair of wings extending from the two sides thereof and are respectively adjacent to the third magnet and the fourth magnet.

According to another aspect of the present application, a motor rotor is provided. The motor rotor may comprise a rotor body part, and the body part comprises a first opening and a second opening axially running therethrough and a third opening, located between the first opening and the second opening, axially running therethrough. The first opening is provided with a first end adjacent to the third opening; the second opening is provided with a second end adjacent to the third opening; and in a cross section perpendicular to the central axis of the rotor, the first opening and the second opening being generally arranged in a V shape. The rotor body part may further comprise a first pair of magnets consisting of a first magnet and a second magnet respectively embedded into the first opening and the second opening, and a magnetic shielding component embedded into the third opening. The magnetic shielding component may comprise a radially extended base, a tail adjacent to the central axis and connected with the base, and a head away from the central axis and connected with the base, wherein an axial outer side surface of the head is spaced apart from the first end of the first opening and the second end of the second opening; an axial outer side surface of the tail is spaced apart from the first end of the first opening and the second end of the second opening; a first side of the base is adjacent to the first end of the first opening and a second side of the base is adjacent to the second end of the second opening.

According to one embodiment of the present application, the first magnet comprises a first surface away from the central axis and a second surface facing the central axis; and the second magnet comprises a third surface away from the central axis and a fourth surface facing the central axis, wherein the first surface and the third surface and extension surfaces thereof define a first area away from the central axis and a second area adjacent to the central axis; the head of the magnetic shielding component is located in the first area and the tail is located in the second area.

According to another embodiment of the present application, the first side and the second side of the base of the magnetic shielding component are respectively in contact with the first magnet and the second magnet.

According to still another embodiment of the present application, the magnetic shielding component comprises a first wing and a second wing respectively extending from the base to the first magnet and the second magnet, and ends of the first wing and the second wing are respectively in contact with the first magnet and the second magnet.

According to still another embodiment of the present application, the magnetic shielding component is in mirror symmetry relative to a radial line; a width of the head is greater than a width of the base; a width of the tail is greater than the width of the base; and a direction of the width is basically perpendicular to a radial direction of the rotor; the head is provided with a first contact surface facing the central axis, and the tail is provided with a second contact surface away from the central axis and opposite to the first contact surface; when the rotor is subjected to a centrifugal force during rotation, the first contact surface provides a reaction force to a part of an inner wall of a cavity for accommodating the head in the first area, so that the first area remains in contact with the magnetic shielding component; and a part of an inner wall of a cavity for accommodating the tail in the second area provides a reaction force to the second contact surface, so that the tail of the magnetic shielding component remains in the second area.

According to still another embodiment of the present application, the width of the tail of the first magnetic shielding component is greater than the width of the head.

According to another embodiment of the present application, the rotor further comprises a third magnet and a fourth magnet; the third magnet and the fourth magnet generally form a V shape and are farther away from the central axis than the first magnet and the second magnet in the radial direction, such that the first magnet, the second magnet, the magnet, and the fourth magnet form a double V-shaped magnet structure; the magnetic shielding component comprises a first pair of wings extended from two sides of the base and a second pair of wings extended from the two sides of the base; two ends of the first pair of wings are adjacent to the first magnet and the second magnet, and two ends of the second pair of wings are adjacent to the third magnet and the fourth magnet.

According to still another embodiment of the present application, the motor rotor further comprises a second pair, a third pair, a fourth pair, a fifth pair, a sixth pair, a seventh pair, and an eighth pair of magnets arranged, in the same manner as the first magnet and the second magnet, along a circumferential direction of the body part, and a second, a third, a fourth, a fifth, a sixth, a seventh, and an eighth magnetic shielding components identical to the first magnetic shielding component and located in an area from the second pair of magnets to the eight pair of magnets; and the first to the eighth magnetic shielding components are made of a stainless steel material.

According to still another embodiment of the present application, the motor rotor comprises at least two rotor segments superposed in the axial direction, wherein the magnetic shielding component is an integral component configured to run through the at least two rotor segments.

One or more embodiments according to the present application provide a rotor design that may reduce magnetic leakage to improve magnetic flux efficiency and improve the structural strength of the rotor as compared to various prior art rotor designs that also attempt to reduce magnetic leakage.

The above and other advantages and features of the present application will become apparent by merely referring to the following detailed description of embodiments or in combination with the accompanying drawings.

BRIEF DESCRIPTION OF THE DRAWINGS

For a more complete understanding of embodiments of the present application, reference should be made to more detailed description in the accompanying drawings and the embodiments described through examples below. In the drawings.

DETAILED DESCRIPTION

Figure 1:
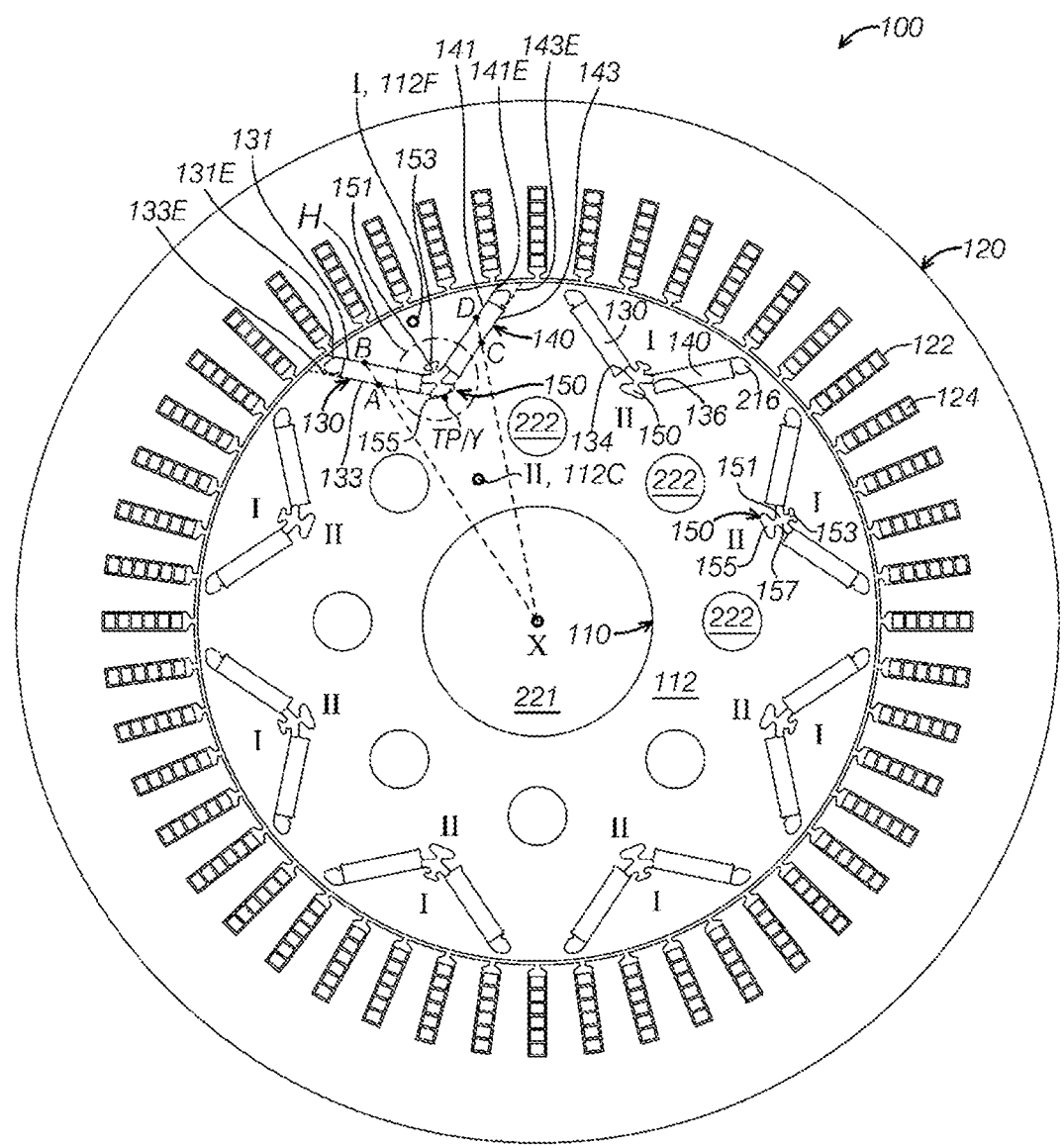
FIG. 1 schematically shows an end view of a motor according to a first embodiment of the present application.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

For reference numerals in the drawings, the same or similar reference numerals are used to indicate the same or similar components. In the description below, multiple operation parameters and components are described in multiple embodiments. These specific parameters and components are included herein as examples only and are not meant to be limiting. While generally described as a motor, those of ordinary skill in the art will recognized that a motor is an electric machine that may be operated as a motor and/or generator.

As mentioned in the background, in permanent magnet motors, a bridge area embedded between magnets of a rotor in a V shape is prone to magnetic leakage. The present application provides various embodiments that are intended to more efficiently use the magnet flux generated by the magnets of a rotor and reduce the magnetic leakage. In addition, the inventor of the present application has noticed that, although to a certain extent the magnetic leakage can be reduced by filling the nonmagnetic conductive material in the magnetic shielding component area in the prior art, the structure strength is weakened. Thus, the inventor of the present application provides a rotor in one or a plurality of embodiments that can solve at least one problem in the prior art. On the one hand, the nonmagnetic magnetic shielding component minimizes the undesirable magnetic leakage. On the other hand, through the unique design of the magnetic shielding component, the structure strength of the rotor is improved, and the normal operation of the motor can still be guaranteed when the centrifugal force is large at high speed.

As illustrated in FIG. 1, the end view of the motor 100 is shown. In the embodiment illustrated in FIG. 1, a motor 100 is illustrated, comprising a rotor part 110 and a stator part 120. The stator 120 comprises a plurality of slots 122 arranged in a radial shape and stator windings 124 located in the plurality of slots 122. In this embodiment, a winding section of the stator windings 124 is rectangular; it is to be understood that stator slots and windings may be arranged in other forms. The rotor 110 comprises a rotor body part 112, wherein the body part 112 comprises an opening 221 at the center, a plurality of openings 222 for cooling and the like, and a plurality of pairs of magnets embedded into the body part 112. Each pair of magnets may comprise a first magnet 130 and a second magnet 140; and the first magnet 130 and the second magnet 140 are arranged at an angle and spaced apart from each other by a magnetic shielding component 150. Such arrangement of each pair of magnets is usually referred to as a V-shaped layout or V-shaped arrangement. In accordance with the V-shaped arrangement, there further exists a delta-shaped permanent magnet arrangement, i.e., an arrangement where each group of magnets approximately form a triangle. Although the embodiment of the present application is discussed using the V-shaped arrangement, it is to be understood that advantages can be obtained by adopting a solution according to one or more embodiments of the present application.

As also shown in FIG. 1, the first magnet 130 and the second magnet 140 generally extended along the axial direction of the rotor body part 112, i.e., in a direction perpendicular to the plane of FIG. 1. In the end face or the cross section illustrated in FIG. 1, the first magnet 130 and the second magnet 140 generally divide the rotor body part 112 into a part 112C closer to the central axis X and a part 112F far away from the central axis X. Specifically, the first magnet 130 comprises a first surface 131 away from the central axis X of the rotor body part and faces the periphery of the rotor, and a second surface 133 that faces the central axis X. The second magnet 140 comprises a third surface 141 away from the central axis X and faces the periphery of the rotor, and a fourth surface 143 that faces the central axis X. The meaning of the term "facing" or "away from" the central axis X is not absolute, but rather relative. In other words, as illustrated in the drawing, when any radial line extends from the central axis, point B on the first surface 131 is farther away from the central axis X than point A on the second surface 133, and point D on the third surface 141 is farther away from the central axis X than point C on the fourth surface 143. The first surface 131 and the third surface 141 and corresponding extension surfaces 131E and 141E thereof define a first area I, i.e., area 112F, that is far away from the central axis X, and a second area II facing the central axis X, i.e., the area 112C mentioned above. Along the circumferential direction, a plurality of pairs of magnets 130 and 140 may be arranged as illustrated in the drawing, such that there may exist a plurality of first areas I and second areas II. The first areas and second areas located among the plurality of pairs of magnets in the circumferential direction may not be clearly distinguished and defined. For example, the second area II may be continuous, i.e., the area 112 C mentioned above. One pair of magnets are used as an example to illustrate the relative positions of the first area I and the second area II.

As illustrated in FIG. 1 and FIGS. 2-4, the magnetic shielding component 150 comprises a head 153 in the first area I, a tail 155 in the second area II, a base 151 connecting the head 153 and the tail 155, and a pair of wings 157 extending from the base 151 to the first magnet 130 and the second magnet 140 as illustrated in the drawings. A first side 159a of the wing 157 is adjacent to or in contact with a first end 134 of the first magnet 130; and a second side 159b of the wing 157 is adjacent to or in contact with a second end 136 of the first magnet 130. Point TP closest to the central axis X of the tail 155 of the magnetic shielding component 150 coincides with a connecting line crossing point Y of an extension surface 133E of the second surface 133 and an extension surface 143E of the fourth surface 143; or the point TP is farther away from the central axis X than the crossing point Y. The magnetic shielding component 150 may be made of a nonmagnetic material, such as, but not limited to, the stainless steel material. On the one hand, the magnetic shielding component 150 may prevent the magnetic leakage of the first magnet 130 and the second magnet 140; and on the other hand, it can structurally connect the first area with the second area. More details are provided below.

Figure 2:
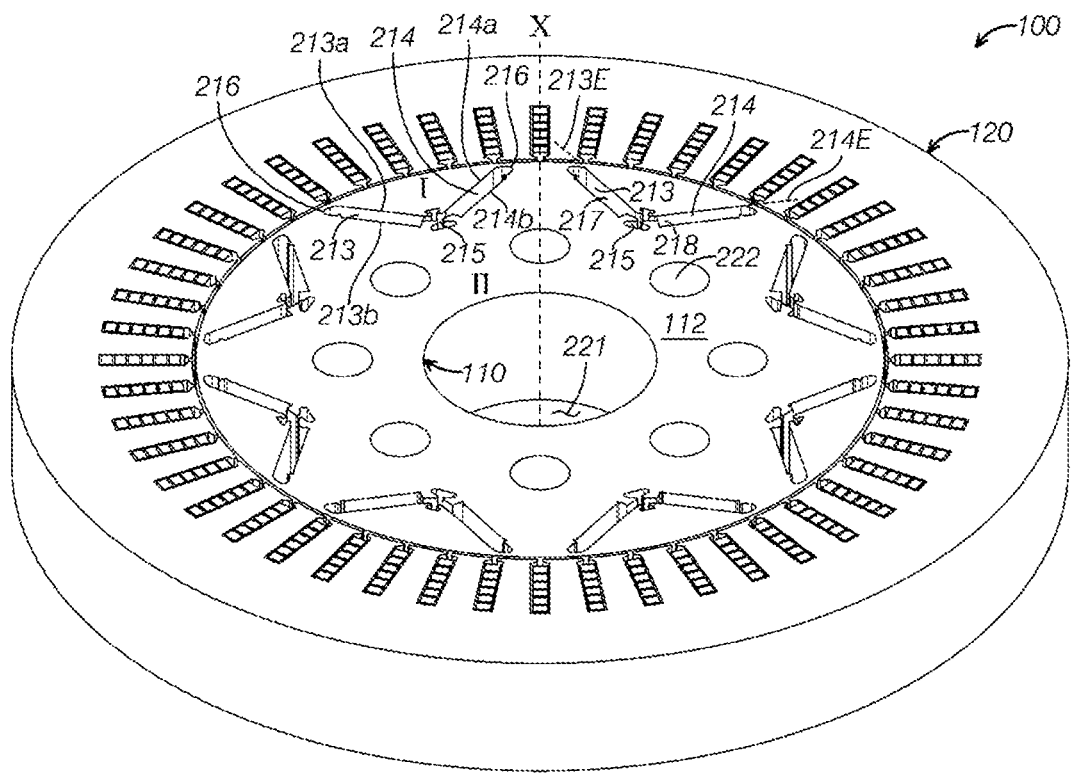
FIG. 2 schematically shows a partial perspective view of a motor according to the first embodiment of the present application.

FIG. 2 illustrates a perspective view of the motor 100 according to one embodiment, wherein a state in which no magnets and magnetic shielding components are assembled is illustrated. As illustrated in FIG. 2, the motor 100 may comprise a stator 120 and a rotor 110; and the rotor 110 may be a segment or a part of the whole rotor in the axial direction X. In the axial direction X, the rotor may consist of a plurality of segments. For example, two to six segments may be superposed in the axial direction X. In one embodiment, the rotor may consist of four segments. In other embodiments, the rotor may consist of one entire segment. For example, as illustrated in FIG. 2, the rotor comprises a plurality of segments, and one segment 110 of the rotor is illustrated in the present embodiment. Together with the illustration shown in FIG. 1, the rotor 110 may comprise a rotor body part 112, and the body part 122 defines a plurality of openings, such as the aforementioned central through holes 221 located at the center, the axially run-through holes 222 for cooling and other purposes, and a plurality of openings for accommodating the first magnet 130, the second magnet 140 and the magnetic shielding component 150. For the convenience of description, a pair of openings are used as an example to illustrate the magnets and the magnetic shielding component of the rotor.

Figure 3:
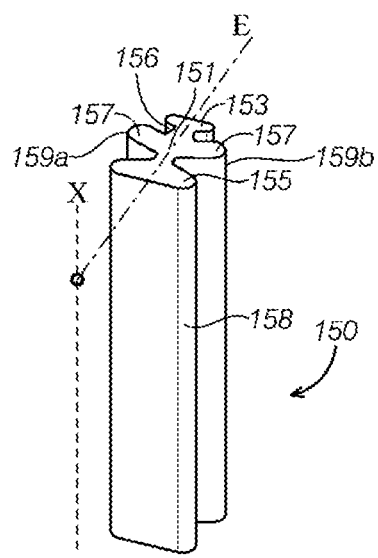
FIG. 3 schematically shows a perspective view of a magnetic shielding component according to the first embodiment of the present application.

FIG. 3 illustrates a perspective view of the magnetic shielding component 150. As described above, the magnetic shielding component 150 comprises the base 151 generally extending radially, the tail 155 close to the central axis X, and the head 153 far away from the central axis X. The magnetic shielding component 150 is in mirror symmetry relative to a radial line E of the rotor axis X and the periphery of the rotor. In other words, the magnetic shielding component 150 is in mirror symmetry relative to its centerline.

Figure 4:
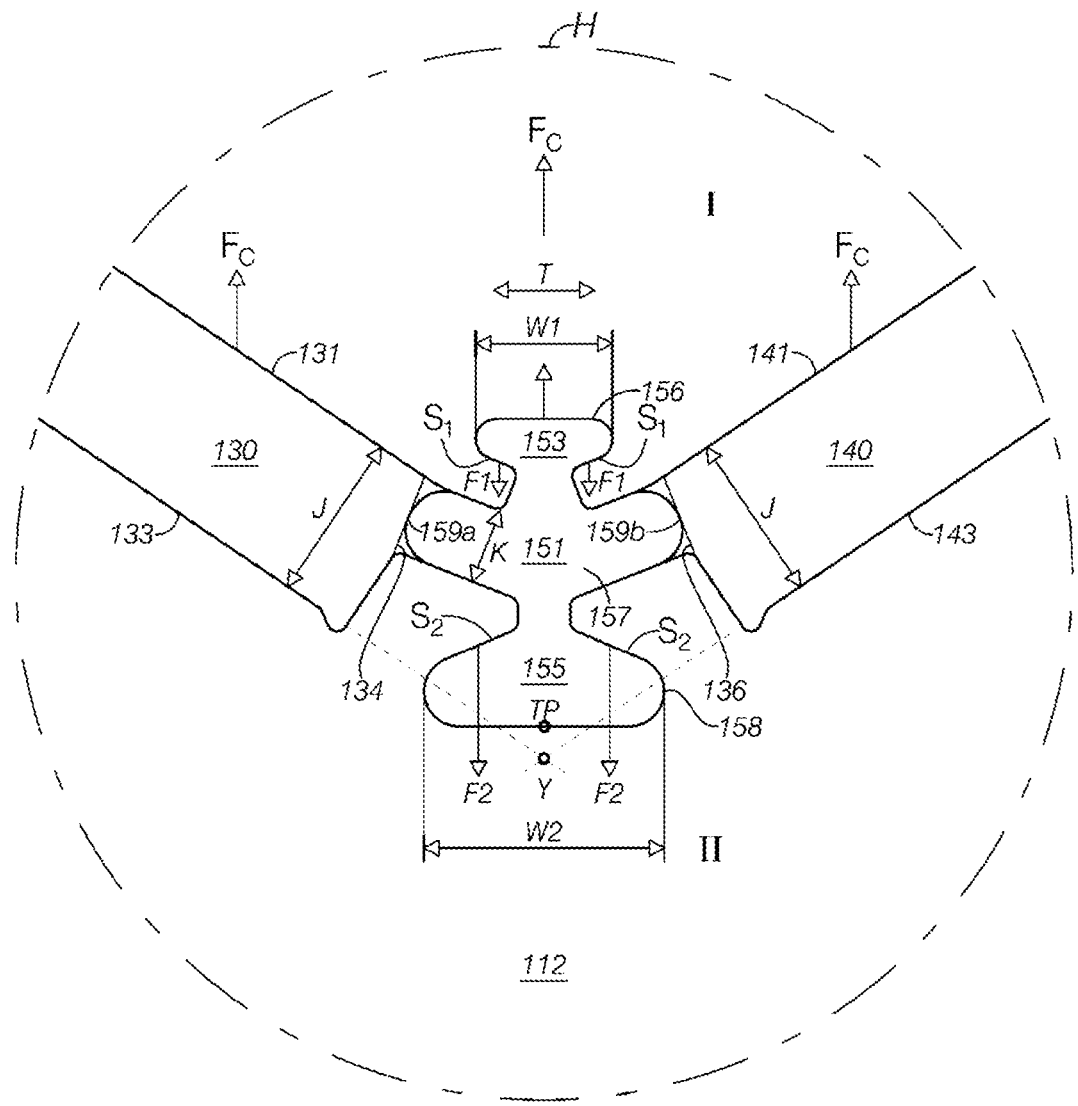
FIG. 4 schematically shows a simple stress analysis of a rotor and a magnetic shielding component in area H according to the first embodiment of the present application.

Together with the illustration shown in FIGS. 1 to 3, in the described embodiment, the rotor body part 112 comprises a first opening 213 and a second opening 214 axially running therethrough; and the first opening 213 and the second opening 214 are spaced apart by a third opening or a first transition area. In other words, the first opening 213 and the second opening 214 communicate with each other through the third opening 215. The first opening 213 is provided with a first end 217 adjacent to the third opening 215, and the second opening 214 is provided with a second end 218 adjacent to the third opening 215. The first opening 213 and the second opening 214 are respectively used for the first pair of magnets consisting of the first magnet 130 and the second magnet 140 to be embedded therein. The third opening 215 is configured to accommodate the magnetic shielding component 150. In the end face perpendicular to the central axis X of the rotor, the first opening 213 and the second opening 214, or, i.e., the first magnet 130 and the second magnet 140, are generally arranged in a V shape. An outer side surface 156 of the head 153 of the magnetic shielding component 150 along the axial direction is only in contact with the rotor body part 112. That is, the outer side surface 156 of the head 153 in the axial direction is spaced apart from the first end 217 of the first opening 213 and the second end 218 of the second opening 214, and is farther away from the central axis X of the rotor than the first end 217 and the second end 218. Referring further to FIG. 4, the head 153 comprises a first contact surface S1 facing the body center X; and the first contact surface S1 may be a part of the outer side surface 156. In the illustrated embodiment, the first contact surface S1 is spaced apart from the first opening 213 and the second opening 214. That is to say, the head 153 of the magnetic shielding component 150 is relatively independent of the first opening 213 and the second opening 214, and the first magnet 130 and the second magnet 140 respectively embedded into the first opening 213 and the second opening 213. An outer side surface 158 of the tail 155 of the magnetic shielding component 150 is only in contact with the rotor body part 112 along the axial direction, and is relatively independent of the first opening 213, the second opening 214, and the first magnet 130 and the second magnet 140 respectively embedded into the first opening 213 and the second opening 214. Similarly, in the illustrated embodiment, the motor rotor 112 further comprises a second pair, a third pair, a fourth pair, a fifth pair, a sixth pair, a seventh pair, and an eighth pair of magnets arranged, in the same manner as the first magnet 213 and the second magnet 214, along a circumferential direction of the body part, as well as eight pairs of similar magnets located in the eight pairs of openings. Similarly, the motor rotor 112 comprises a second, a third, a fourth, a fifth, a sixth, a seventh, and an eighth magnetic shielding components identical to the first magnetic shielding component 150, wherein the first to eighth magnetic shielding components may be made of a magnetic shielding material, such as, but not limited to, the stainless steel material.

As illustrated at least in FIG. 2, the first opening 213 comprises a first inner wall 213a relatively far away from the central axis but faces the central axis, and a second inner wall 213b relatively close to but faces away from the central axis X; as described above, the first magnet 130 comprises the first surface 131 away from the central axis and a second surface 133 facing the central axis. The first inner wall 213a is adjacent to the first surface 131 of the first magnet 130; and the gap therebetween can be ignored, which is not described herein. Similarly, the second opening 214 comprises a first inner wall 214a relatively far away from the central axis but faces the central axis, and a second inner wall 214b relatively close to but faces away from the central axis X; the first magnet 140 comprises the third surface 141 away from the central axis and the fourth surface 143 facing the central axis. The first inner wall 214a is adjacent to the third surface 141 of the second magnet 140; and the gap therebetween can be ignored. An extension surface 213E of the first inner wall 213a and an extension surface 214E of the first inner wall 214a, or, the extension surface 131E of the first surface 131 and the extension surface 141E of the third surface, define the first area I away from the central axis and a second area II adjacent to the central axis. The head 153 of the magnetic shielding component 150 is located in the first area I, whereas the tail 155 is located in the second area II. Similar to the example illustrated in FIG. 1, the meaning of the term "facing" or "away from" the central axis X is not absolute, but rather relative.

In the embodiment illustrated in FIG. 2, there may exist a plurality of first areas I defined by a plurality of pairs of openings or magnets, as well as second areas II communicated with each other. There is no need to distinguish the first areas from the second areas in the circumferential direction among a plurality of pairs of magnets. The first areas and second areas are introduced to mainly describe the relative relationships and the structure and function of the magnetic shielding component. In the above-mentioned embodiment in which the rotor 112 consists of a plurality of rotor segments separated in the axial direction, the first magnet 130 and the second magnet 140 may similarly be segmented in the axial direction. In other words, the first magnet and the second magnet may have a size corresponding to the axial length of the rotor segment. In one embodiment, the magnetic shielding component 150 is preferably not segmented, but instead having a size running through the axial direction of the entire rotor in order to provide a better magnetic shielding effect and structural strength.

FIG. 4 illustrates an enlarged schematic diagram of area H in FIG. 1. A simple stress analysis of the magnetic shielding component 150 is also provided. Together with the illustration shown in FIGS. 1 to 4, when the motor rotates at a high speed, the rotor 112 itself, especially the first area I and the magnets 130 and 140, will be subjected to the centrifugal force Fc. The first area being subjected to the centrifugal force Fc is illustrated in the figures. In order to reduce magnetic leakage, air gaps 216 are kept from the ends of the first magnet 130 and the second magnet 140 close to the outer edge of the rotor to the ends of the corresponding first opening 213 and the second opening 214; and a distance between the air gaps and the outer edge/periphery of the rotor is desirably to be as short as possible. This configuration might make the first area I, including the magnets, to move away from the central axis during a high-speed rotation. The motor provided in the present application can minimize the magnetic leakage on the one hand, and effectively improve the strength on the other by providing the magnetic shielding component that connects the first area I and the second area II.

With continuing reference to FIG. 4 in combination with FIG. 1-3, the magnetic shielding component 150 in the above embodiment comprises the base 151, the head 153, the tail 155, and the wings 157. The base 151 generally extends radially, and the head 153 and the tail 155 have a size larger than that of the base 151. For example, from the tangential direction T of the circumference, i.e., the direction perpendicular to the radial direction, a width W1 of the head 153 is greater than the size of the base 151; and the width W2 of the tail 255 is greater than the size of the base 151. Based on the described embodiment, one can see that the head 153 located in the first area I comprises a first contact surface S1, whereas the tail 155 located in the second area II comprises a second contact surface S2; the first contact surface S1 and the second contact surface S2 face each other. In the described embodiment, the first contact surface S1 is spaced apart from the first opening 213, the second opening 214, the first magnet 130 in the first opening 213, and the second magnet 140 in the second opening 214. Similarly, the second contact surface S2 may be a part of the outer side surface 158 of the tail 155; and the outer side surface 158 of the tail 155 and the second contact surface S2 may be spaced apart from the first opening 213, the second opening 214, the first magnet 130 in the first opening 213, and the second magnet 140 in the second opening 214.

As illustrated in FIG. 3, when the rotor rotates and the first area I, the first magnet 130, the second magnet 140, and the magnetic shielding component 150 are subjected to the centrifugal force Fc, if the magnetic shielding component 150 does not exist, a gap would appear between the first magnet 1130 and the second magnet 140, and the first area I tends to move away from the central axis. When the magnetic shielding component 150 is provided, the first contact surface S1 of the head 153 of the magnetic shielding component 150 provides a reaction force F1 to a part of the inner wall of a cavity for accommodating the head in the first area I, so that the first area I remains in contact with the magnetic shielding component 150. The second contact surface S2 of the tail 155 of the magnetic shielding component 150 is constructed such that, when the rotor rotates and the first area I and the magnetic shielding component 150 are subjected to the centrifugal force, a part of the inner wall of a cavity for accommodating the tail 155 in the second area II provides a reaction force F2 to the second contact surface S2, so that the magnetic shielding component 150 remains in the second area II. The structure and size of the magnetic shielding component may be modified based on needs. For example, in one embodiment, the width W1 of the head in the tangential direction T (i.e., the direction perpendicular to the radial direction) is smaller than the width W2 of the tail. In one example, W1 is about 0.5 to 1 times W2. In another embodiment, the extension directions of the surfaces 131 and 133 of the first magnet 130 and the surfaces 141 and 143 of the second magnet 140 may be referred to as the length directions of the magnets, and the direction perpendicular to the length direction of the magnet in the cross section may be a cross-sectional width J. The cross-section width J of the first magnet 130 and the second magnet 140 is greater than a cross-sectional width K of the wings 157 of the magnetic shielding component 150. In one embodiment, the cross-section width J of the first magnet 130 and the second magnet 140 is at an angle relative to the cross-section width of the wings 157 of the magnetic shielding component 150. In another embodiment, the cross-sectional width J of the first magnet 130 and the second magnet 140 is substantially in parallel with a direction of the cross-sectional width of the wings 157 of the magnetic shielding component 150.

Figure 5:
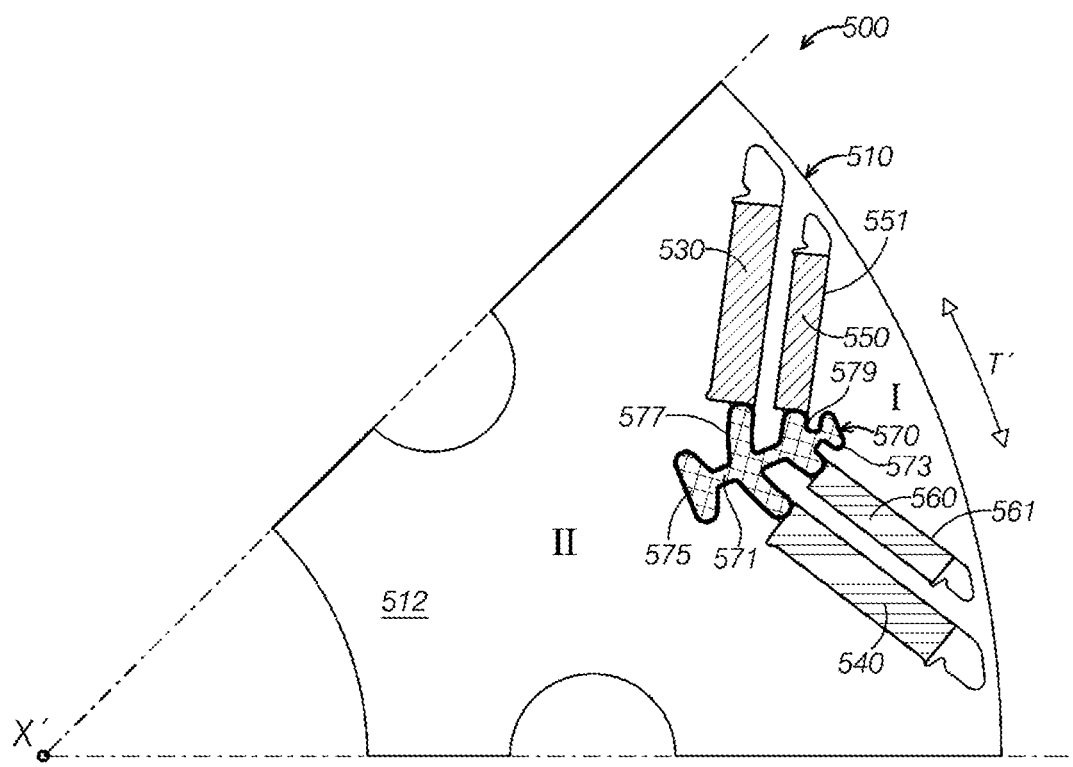
FIG. 5 shows a partial schematic view of a rotor and a magnetic shielding component according to a second embodiment of the present application.
Figure 6:
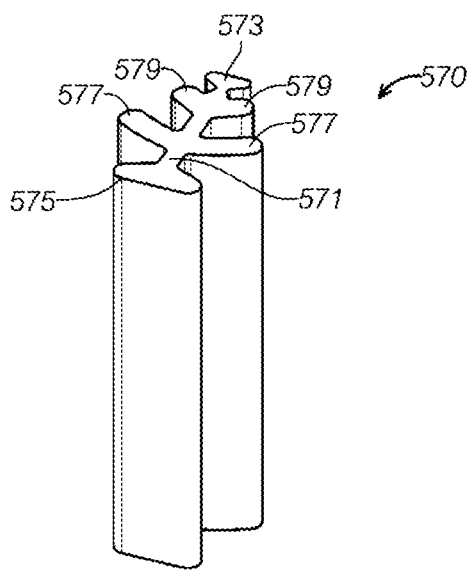
FIG. 6 schematically shows a perspective view of the magnetic shielding component of FIG. 5.

FIG. 5 illustrates a partial view of a rotor 510 of a motor 500 in the second embodiment of the present application, and specifically shows an arrangement of a pair of magnets and a magnetic shielding component. FIG. 6 illustrates a perspective view of the magnetic shielding component in the embodiment. Similar to the embodiment illustrated in FIG. 1, the motor comprises a rotor part 510 and a stator part (not shown). The rotor 510 comprises a rotor body part 512, and a first magnet 530, a second magnet 540, a third magnet 550, and a fourth magnet 560 embedded into the body part 512. Such an arrangement of the magnets is usually referred to as a double V-shaped configuration or double V-shaped arrangement. Specifically, the third magnet 550 and the fourth magnet 560 generally form a V-shape, and are farther away from the central axis X' than the first magnet 530 and the second magnet 540 in the radial direction. Magnetic shielding components 570 separate the first magnet 530 from the second magnet 540 and separate the third magnet 550 from the fourth magnet 560. Similar to the example illustrated in FIGS. 1-4 above, the surfaces 551 and 561 of the third magnet 550 and the fourth magnet 560 away from the central axis (or relatively speaking, facing the periphery of the rotor) and the extension surfaces define a first area I facing away from the central axis and a second area II relatively close to the central axis. The magnetic shielding component 570 likewise comprises a base 571, a head 573 extending into the first area, a tail 575 extending into the second area, a first pair of wings 577 adjacent to the first magnet 530 and the second magnet 540, and a second pair of wings 579 adjacent to the third magnet 550 and the fourth magnet 560. Likewise, a size of the head 573 and a size of the tail 575 may be larger than that of the base 571; in the tangential direction T', a size of the head 573 may be smaller than that of the tail 575 in the tangential direction.

Figure 7A:
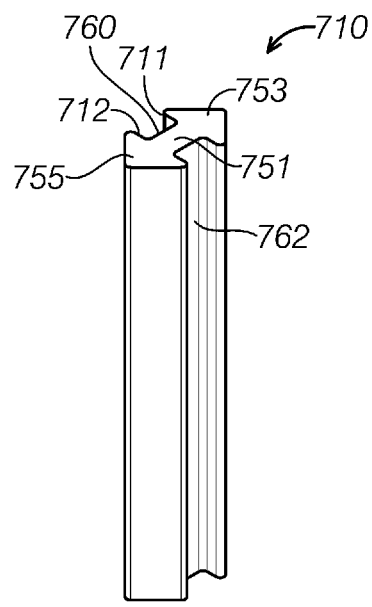
FIGS. 7A to 7C schematically show perspective views of magnetic shielding components according to a third, a fourth, and a fifth embodiments.
Figure 7B:
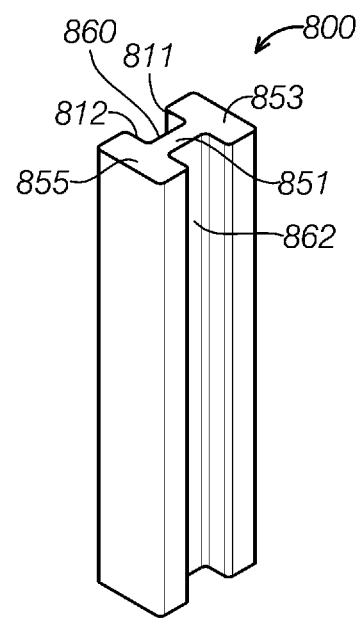
Figure 7C:
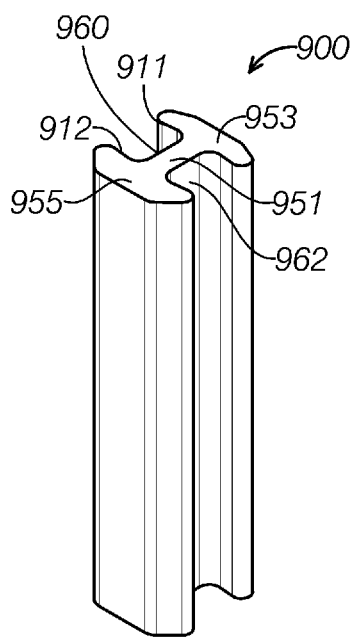

In the above-mentioned embodiment, different designs of rotors and magnetic shielding components are described. It is to be understood that the magnetic shielding component may also be designed in other structures based on needs. For example, referring to FIGS. 7A-7C, possible structure designs for the magnetic shielding components 710, 720, and 730 in the third, the fourth, and the fifth embodiments are shown. In other words, the magnetic shielding component may have a base, a head, and a tail. The width of the head is greater than the width of the base; and the width of the tail is greater than the width of the base. The direction of the width is basically perpendicular to the radial direction of the rotor. The width direction may also be similar to the tangential direction of the rotor mentioned in the above embodiment. The head and/or tail of the magnetic shielding component in different examples may have different designs. For example, the head and/or tail may be provided with a triangular cross section, a trapezoidal cross section, a rectangular cross section, etc. FIGS. 7A to 7C have the following in common: the head and the tail have opposite contact surfaces or tangential contact surfaces perpendicular to the radial direction.

As illustrated in FIG. 7A, the magnetic shielding component 700 comprises a base 751, a head 753, and a tail 755. The head 753 and the tail 755 of the magnetic shielding component 700 are respectively located in the first area and the second area of the rotor. The head 753 is provided with a tangential first contact surface 711 in the first area and the tail 755 is provided with a tangential second contact surface 712 in the second area. The base 751 is provided with a first side 760 and a second side 762.

As illustrated in FIG. 7B, the magnetic shielding component 800 comprises a base 851, a head 853, and a tail 855. The head 853 and the tail 855 of the magnetic shielding component 800 are respectively located in the first area and the second area of the rotor. The head 853 is provided with a tangential first contact surface 811 in the first area and the tail 855 is provided with a tangential second contact surface 812 in the second area. The base 851 is provided with a first side 860 and a second side 862.

As illustrated in FIG. 7C, the magnetic shielding component 900 comprises a base 951, a head 953, and a tail 955. The head 953 and the tail 955 of the magnetic shielding component 900 are respectively located in the first area and the second area of the rotor. The head 953 is provided with a tangential first contact surface 911 in the first area and the tail 855 is provided with a tangential second contact surface 912 in the second area. The base 951 is provided with a first side 960 and a second side 962.

Together with the illustration shown in FIGS. 1 to 4, the first contact surfaces 711, 811, and 911 of the magnetic shielding components 700, 800, and 900 face the central axis and are in contact with the first area I, whereas the second contact surfaces 712, 812, and 912 face away the central axis (or face the periphery of the rotor) and are in contact with the second area II. When the rotor rotates and the first area and the magnetic shielding component are subjected to the centrifugal force, the first contact surface is in contact with the first area to provide a reaction force, so that the magnetic shielding component remains in contact with the first area. That is to say, when under the effect of the centrifugal force, the magnetic shielding component maintains the connection between the first area and the second area. The second area provides a reaction force through the second contact surface so that the magnetic shielding component remains in the second region. That is to say, when under the effect of the centrifugal force, the magnetic shielding component maintains the connection with the second area, thereby maintaining the connection between the first area and the second area. Compared with the examples illustrated in FIGS. 1 and 2, the magnetic shielding components illustrated in FIGS. 7A, 7B, and 7C do not have wings. Please refer to the examples illustrated in FIGS. 1-4 above; when the rotor rotates and is subjected to the centrifugal force, the design of having a contact surface in contact with the first area and the second area achieves the structural strength of the rotor magnets when combined with the outer peripheral part and the inner peripheral part. In such an embodiment, the first magnet and the second magnet may extend to the base of the magnetic shielding component. In some embodiments, the first sides 760, 860, and 960 of the bases 751, 851, and 951 are in contact with the first magnet; and the second sides 762, 862, and 962 of the bases 751, 851, and 951 are in contact with the second magnet. In another embodiment, the first sides 760, 860, and 960 of the bases 751, 851, and 951 are adjacent to the first magnet; and the second sides 762, 862, and 962 of the bases 751, 851, and 951 are adjacent to the second magnet. The base of the magnetic shielding component may be spaced apart from the first magnet and the second magnet by means of air gaps, thus providing a magnetic shielding effect.

Figure 8A:
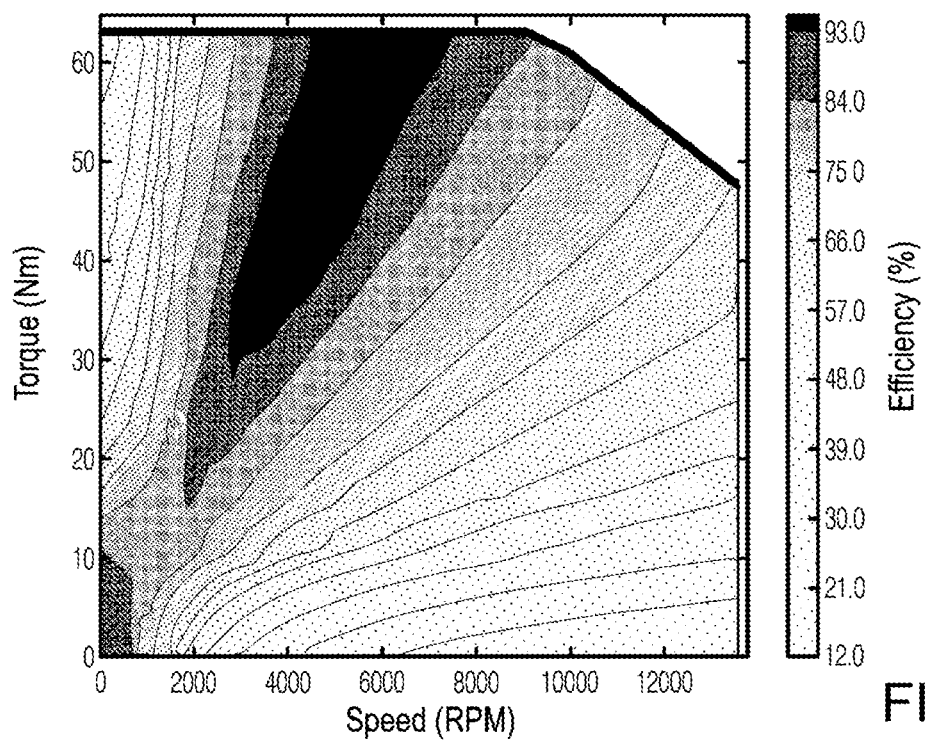
FIGS. 8A and 8B show comparative diagrams of the simulation results of motor speed, torque, and efficiency in the first embodiment.
Figure 8B:
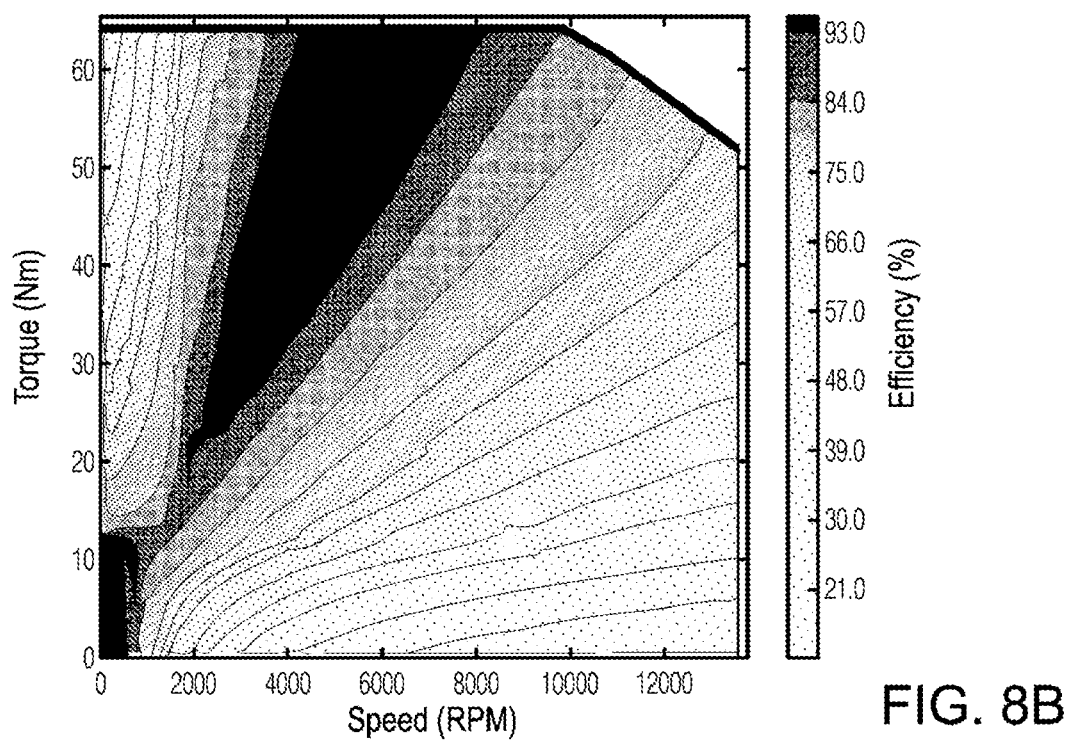
Figure 9A:
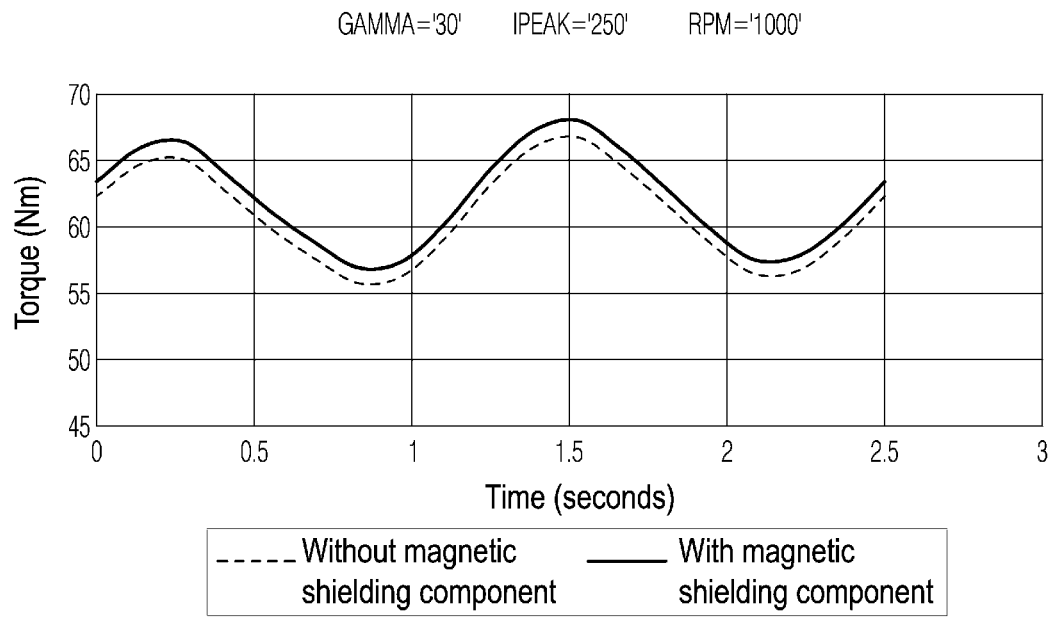
FIGS. 9A to 9D show comparative diagrams of torque fluctuation curves of the motor at different speeds in the first embodiment.
Figure 9B:
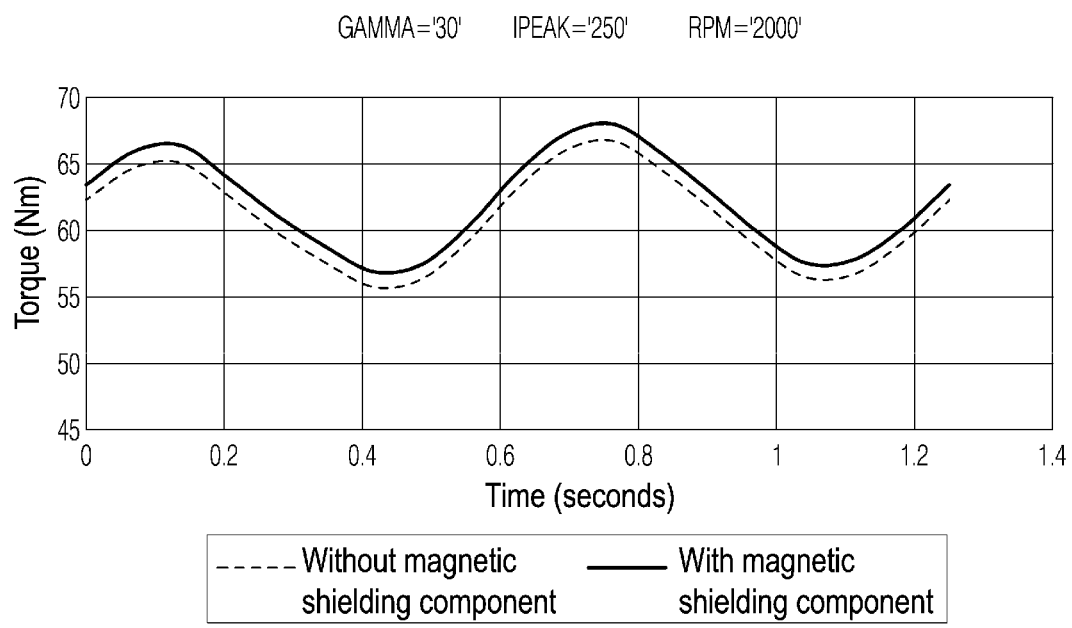
Figure 9C:
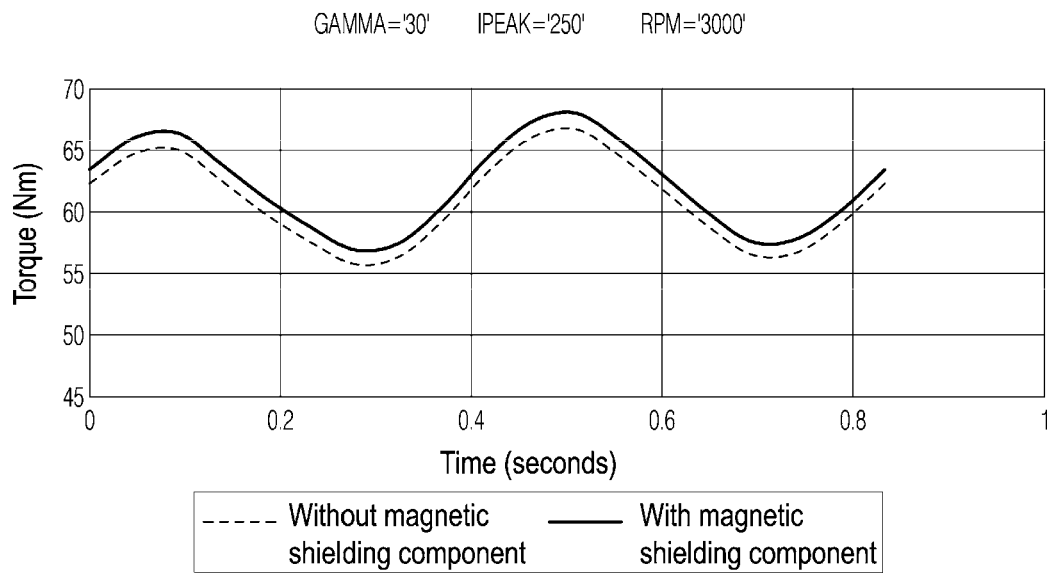
Figure 9D:
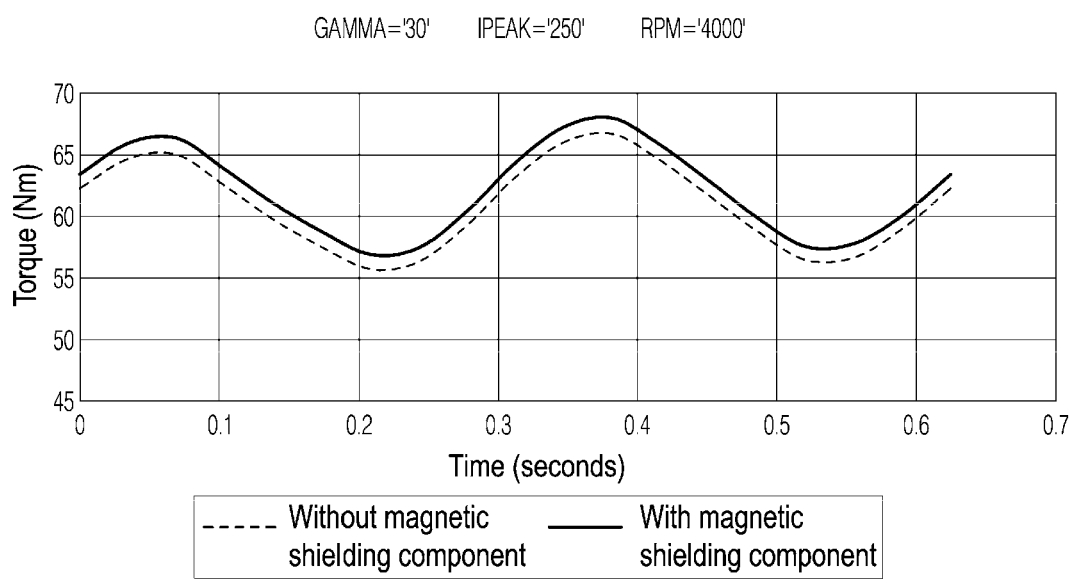

FIG. 8A shows a relationship among torque, efficiency, and speed of a motor without a magnetic shielding component. FIG. 8B shows a relationship among torque, efficiency, and speed of a motor with a magnetic shielding component according to the embodiments illustrated from FIGS. 1 to 4. The x-axis SPEED represents the motor speed (RPM), the first y-axis TORQUE on the left side of the drawing represents the torque (Nm); and the motor efficiency is represented by different shadow areas. The bar on the right side of the drawing shows the motor efficiency in the corresponding shadow area. Based on the figures, one can see that, compared with the motor efficiency of the motor without the magnetic shielding component, which is a traditional design, in FIG. 8A, the high efficiency area of the motor with the magnetic shielding component in FIG. 8B (the area with efficiency greater than 84%) has been significantly improved. The black triangular area with the darkest shadow, i.e., the area with efficiency greater than 93%, shows a significant improvement in efficiency.

FIGS. 9A to 9D illustrate comparative diagrams of torque fluctuation curves of the motor according to the first embodiment and the motor without the magnetic shielding component at different speeds. FIGS. 9A to 9D illustrate the comparisons of torque of one cycle at speed 1000 rpm, 2000 rpm, 3000 rpm, and 4000 rpm respectively. Other parameters are the same; the peak current is 250 A and the initial current phase angle is 30. During the period of torque fluctuation at different speeds, the torque curve of the motor with the magnetic shielding component is indicated by the solid line, and the torque curve of the motor without the magnetic shielding component is indicated by the dotted line. Under the same conditions, the torque of the motor with the magnetic shielding component is higher than that of the motor without the magnetic shielding component.

As illustrated above, in one or a plurality of embodiments, a motor rotor is provided, comprising a rotor body part, a first magnet and a second magnet embedded into the body part and are axially extended, and a magnetic shielding component located between the first magnet and the second magnet. As a result of the special design of the magnetic shielding component, the present application achieves the magnetic shielding effect on the one hand and the structural strength on the other. The simulation results also show that the embodiments in which the magnetic shielding component is used have great efficiency and torque performance. Various changes, modifications, and alterations can be made by those skilled in the art to these specific embodiments without departing from the essence and scope defined in the claims of the present application.

The claims particularly point out specific combinations and sub-combinations that are considered novel and not obvious. These claims may involve "an" element or "a first" element or similar features. Such claims should be understood as including one or a plurality of such elements, where two or a plurality of such elements are neither required nor excluded. Other combinations and sub-combinations of features, functions, elements, and/or properties described may be claimed through amendment of the current claims or presentation of new claims in the present application or a related application. Such claims, whether broader or narrower than, equivalent to, or different from the original claims, should be regarded as included within the subject matter of the present application.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A motor rotor, comprising:
   a rotor body;
   axially extending first and second magnets embedded into the body, the first magnet and the second magnet being arranged at an angle and spaced apart, the first magnet comprising a first surface away from a central axis of the rotor body and a second surface facing the central axis, the second magnet comprising a third surface away from the central axis and a fourth surface facing the central axis, wherein the first surface and the third surface define a first area of the rotor body away from the central axis and a second area of the rotor body close to the central axis;
   an axially extending magnetic shielding component disposed between the first magnet and the second magnet, wherein the magnetic shielding component includes a first contact surface located within the first area and a second contact surface located within the second area; the first contact surface facing the central axis and in contact with the first area, and the second contact surface facing a periphery of the rotor body and in contact with the second area;
   a third magnet and a fourth magnet, the third magnet and the fourth magnet forming a V shape and disposed farther away from the central axis than the first magnet and the second magnet in a radial direction, such that the first magnet, the second magnet, the third magnet, and the fourth magnet form a double V-shaped magnet structure; and
   wherein the magnetic shielding component comprises a base, a head connected with the base and located in the first area and a tail connected with the base and located in the second area, the base provided with a first pair of wings extending therefrom and respectively adjacent to the first magnet and the second magnet, and a second pair of wings extending from the base respectively adjacent to the third magnet and the fourth magnet.

2. The motor rotor according to claim 1, wherein the magnetic shielding component comprises a nonmagnetic material.

3. The motor rotor according to claim 2, wherein the nonmagnetic material of the magnetic shielding component comprises stainless steel.

4. The motor rotor according to claim 1:
   wherein the first magnet and the second magnet are arranged in a V shape in a cross section perpendicular to the central axis;
   wherein the magnetic shielding component comprises the base, the head connected with the base and located in the first area, and the tail connected with the base and located in the second area, wherein the head comprises the first contact surface, and the tail comprises the second contact surface; and
   wherein a first side of the base is adjacent to the first magnet, and a second side of the base is adjacent to the second magnet.

5. The motor rotor according to claim 4, wherein a width of the head is greater than a width of the base; a width of the tail is greater than the width of the base; and a direction of the width is basically perpendicular to a radial direction of the rotor; and when the rotor is subjected to a centrifugal force during rotation, the first contact surface of the head is in contact with the first area to provide a reaction force opposite to counteract the centrifugal force, so that the head of the magnetic shielding component remains in contact with the first area; and the second area is in contact with the second contact surface of the tail to provide a reaction force to counteract the centrifugal force, so that the tail of the magnetic shielding component remains in contact with the second area.

6. The motor rotor according to claim 5, wherein the magnetic shielding component is in mirror symmetry relative to a radial line.

7. The motor rotor according to claim 6, wherein a width of the tail of the magnetic shielding component is greater than the width of the head, and wherein the width of the tail is less than or equal to two times the width of the head.

8. The motor rotor according to claim 6, wherein a point at the tail of the magnetic shielding component closest to the central axis does not extend beyond an intersection point of an extension surface of the second surface of the first magnet and the fourth surface of the second magnet.

9. The motor rotor according to claim 6, wherein the magnetic shielding component further comprises a pair of wings extending from the base and radially located between the head and the tail, the pair of wings comprising a first side and a second side in contact with the first magnet and the second magnet, respectively.

10. The motor rotor according to claim 9, wherein in the cross section perpendicular to the central axis, the first magnet has a length extending along the first surface and a width perpendicular to the length; the second magnet has a length extending along the second surface and a width perpendicular to the length; the pair of wings has a length and a width perpendicular to the length; and the width of each of the pair of wings is smaller than the width of the first magnet and smaller than the width of the second magnet.

11. A motor rotor, comprising:
a rotor body defining a first opening and a second opening axially running therethrough and a third opening located between the first opening and the second opening axially running therethrough; the first opening having a first end adjacent to the third opening; the second opening having a second end adjacent to the third opening; and in a cross section perpendicular to a central axis of the rotor, the first opening and the second opening being generally arranged in a V shape;
a first magnet and a second magnet respectively embedded into the first opening and the second opening;
a magnetic shielding component embedded into the third opening, wherein the magnetic shielding component comprises a radially extended base, a tail adjacent to the central axis and connected with the base, and a head away from the central axis and connected with the base,
wherein an axial outer side surface of the head is spaced apart from the first end of the first opening and the second end of the second opening,
wherein an axial outer side surface of the tail is spaced apart from the first end of the first opening and the second end of the second opening,
wherein a first side of the base is adjacent to the first end of the first opening, and
wherein a second side of the base is adjacent to the second end of the second opening;
a third magnet and a fourth magnet, the third magnet and the fourth magnet forming a V shape and being farther away from the central axis than the first magnet and the second magnet in a radial direction, such that the first magnet, the second magnet, the third magnet, and the fourth magnet form a double V-shaped magnet structure; and
wherein the magnetic shielding component comprises a first pair of wings and a second pair of wings extending from the base, two ends of the first pair of wings being adjacent to the first magnet and the second magnet, and two ends of the second pair of wings being adjacent to the third magnet and the fourth magnet.

12. The motor rotor according to claim 11, wherein the first magnet comprises a first surface away from the central axis and a second surface facing the central axis; and the second magnet comprises a third surface away from the central axis and a fourth surface facing the central axis, wherein the first surface and the third surface define a first area away from the central axis and a second area adjacent to the central axis; and wherein the head of the magnetic shielding component is located in the first area and the tail is located in the second area.

13. The motor rotor according to claim 11, wherein the first side and the second side of the base of the magnetic shielding component are respectively in contact with the first magnet and the second magnet.

14. The motor rotor according to claim 11, wherein the magnetic shielding component comprises a first wing and a second wing respectively extending from the base to the first magnet and the second magnet, and ends of the first wing and the second wing are respectively in contact with the first magnet and the second magnet.

15. The motor rotor according to claim 11, wherein:
the magnetic shielding component is in mirror symmetry relative to a radial line; a width of the head is greater than a width of the base;
a width of the tail is greater than the width of the base;
a direction of the width is perpendicular to a radial direction of the rotor; and
the head is provided with a first contact surface facing the central axis, and the tail is provided with a second contact surface away from the central axis and opposite to the first contact surface, such that the first contact surface provides a reaction force to an inner wall of a cavity for accommodating the head in a first area so that the first area remains in contact with the magnetic shielding component, and an inner wall of a cavity for accommodating the tail in a second area provides a reaction force to the second contact surface so that the tail of the magnetic shielding component remains in the second area when the rotor is subjected to a centrifugal force during rotation.

16. The motor rotor according to claim 15, wherein the width of the tail of the magnetic shielding component is greater than the width of the head.

17. The motor rotor according to claim 11, wherein the motor rotor further comprises a second pair, a third pair, a fourth pair, a fifth pair, a sixth pair, a seventh pair, and an eighth pair of magnets arranged along a circumferential direction of the rotor body, and a second, a third, a fourth, a fifth, a sixth, a seventh, and an eighth magnetic shielding component located in an area from the second pair of magnets to the eight pair of magnets, wherein the first to the eighth magnetic shielding components are made of a stainless steel material.

* * * * *